D. C. KLAUSMEYER.
DECLUTCHABLE SAFETY COLLAR FOR ROTATABLE NUTS.
APPLICATION FILED NOV. 9, 1920.
1,407,160.
Patented Feb. 21, 1922.
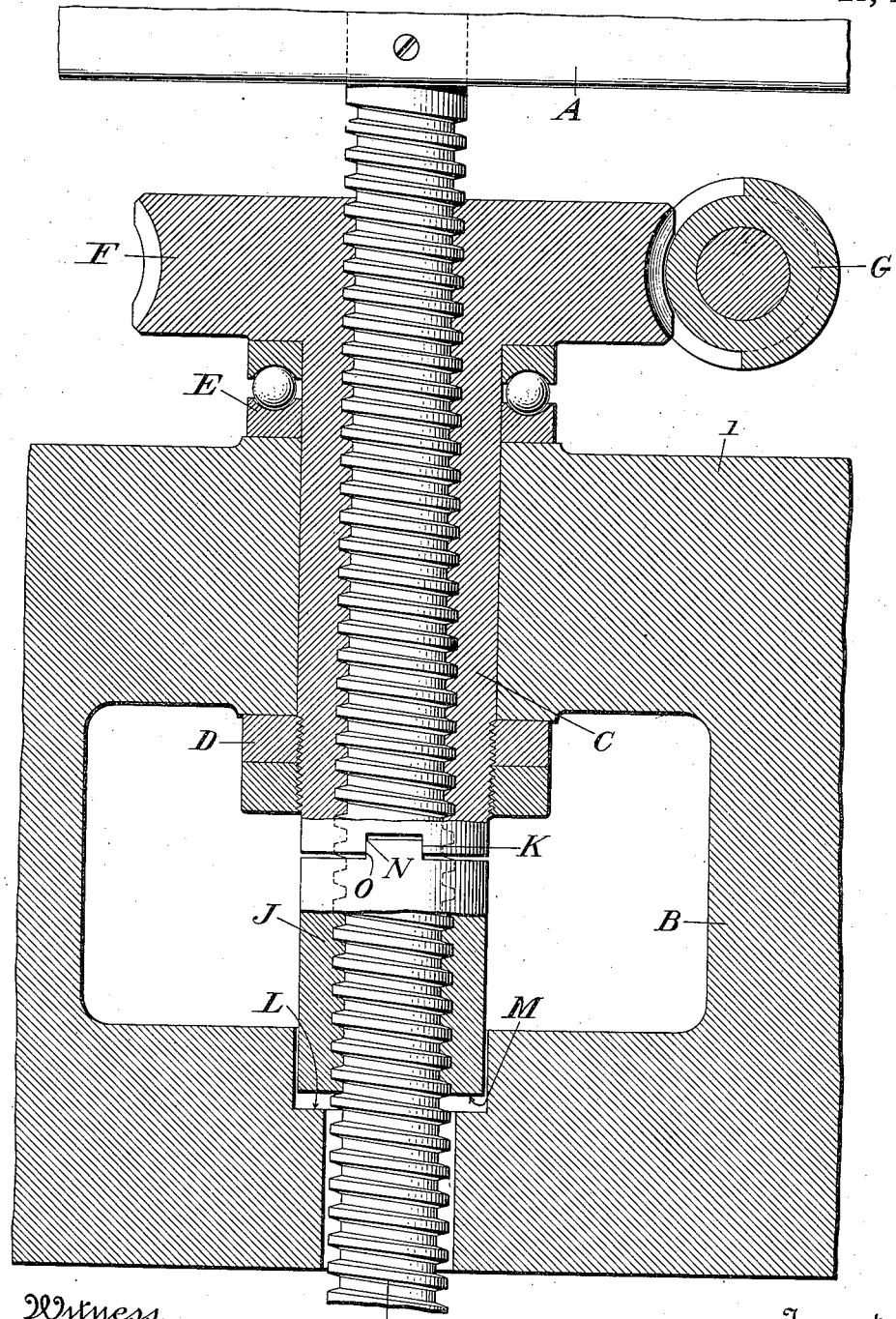

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

DECLUTCHABLE SAFETY COLLAR FOR ROTATABLE NUTS.

1,407,160.  Specification of Letters Patent.  Patented Feb. 21, 1922.

Application filed November 9, 1920. Serial No. 422,981.

*To all whom it may concern:*

Be it known that I, DAVID C. KLAUSMEYER, a citizen of the United States, and residing at Cincinnati, in the county of Hamilton and State of Ohio, have invented a new and Improved Declutchable Safety Collar for Rotatable Nuts, of which the following specification is a full disclosure.

This invention relates to safety devices for elevating mechanisms and it deals more specifically with means for avoiding accidents in case the threads on either the nut or elevating screw should strip as a result of excessive wear or from some other cause.

The accompanying drawing shows, in longitudinal cross-section, the essential features of this invention.

In said drawing, A and B denote, respectively, portions of two members of the organization to which this invention has been applied. These members are relatively movable and are normally subjected to influences, such for example as gravity, which tend to produce such relative movement. For the purpose of causing said members to approach or recede in opposition to the aforesaid constantly acting influence, it is conventional to employ a nut and a screw; the one receiving the thrust of the one member, and the other receiving the opposition of the other. The separation of the members is effected by producing a rotation of the screw or the nut as the case may be. In the drawing, the nut C is shown journaled in the portion 1 of the member B and this nut is provided with thrust-bearings D and E to restrain it from longitudinal displacement with respect to the member B. The nut is suitably provided with a gear F which in turn is driven by a meshing gear G.

A screw H is secured appropriately to the other member A and it extends through the nut C; being threaded thereto as will be understood. By rotating the nut C, it will be evident that the member A will be elevated by reason of a lifting of the screw H. Should the threads fail, the member A would be caused to fall under the action of gravity and for the purpose of preventing any untoward happening of this nature, this invention proposes a normally idle or non-working safety collar J adapted to function to arrest the continued fall of the member A.

This safety collar J is, by means of some suitable engagement or connection K, maintained in non-rotatable relation with the nut C. That is to say, irrespective of whether the nut C is or is not rotated, the safety collar J will normally be maintained in unitary relation with it by the connection K. The characteristic of the connection K is that is ceases to function whenever the normal relation between the nut and the screw is disturbed. Being threaded to the screw, the collar J will trail the nut, so to speak, and keep at the same distance therefrom so long as it is held against rotating relative to the nut by the connection K but, if the threads of the nut should strip, the screw H will undergo an abrupt displacement and simultaneously carry the collar J away from the nut thereby rendering inoperative the connection K and permitting the safety collar J to cease rotating and become immovable with respect to the screw which, in this example, is a non-rotating element. The frame element B supporting the nut is so constructed as to provide a shoulder L which is spaced a slightly greater distance from the nut M of the collar than the distance from N to O so that the collar will be arrested just as soon as it has been completely detached from the rotating nut. Being no longer subjected to any rotative forces, the collar will act as an immovable shoulder on the screw H and will positively arrest any translation of said screw, and the member A controlled by the screw will become immovable with relation to the member B. The attendant will thereby receive notice that the nut requires replacement and no damage can occur.

Without further analysis, the foregoing will so fully reveal the gist of this invention that others can, by applying current knowledge, readily adapt it for various utilizations without omitting certain features that, from the standpoint of the prior art, fairly constitute essential characteristics of the generic or specific aspects of this invention, and therefore such adaptations should be and are intended to be comprehended within the meaning and range of equivalency of the following claims.

Having thus revealed this invention, I claim as new and desire to secure the following combination of steps and elements, or equivalents thereof, by Letters Patent of the United States:

1. A safety device of the nature disclosed combining a stationary screw; a collar threaded thereon; a nut rotatably threaded on said screw and normally engaging said collar to effect its rotation; and a member slightly spaced from said collar and adapted to receive the thrust thereof in the event of the failure of the nut.

2. A safety mechanism combining two separable members; a screw non-rotatably secured to one, and a nut rotatably journaled in the other; and a safety collar threaded on said screw and so connected with said nut as to be rotated thereby, said connection being separable during any untoward translation of said screw and adapted to arrest further translation thereof by abutting against a portion of a member supporting the nut.

3. A safety device comprising two members; a nut journaled in the one, and a screw secured to the other; a safety collar threaded on said screw in proximity with said nut and positioned adjacent an abutment provided by the non-supporting member; and a detachable connection between the collar and nut adapted normally to cause the nut and collar to rotate as a unit.

4. A safety elevating-mechanism combining a lower stationary member and an overlying member adapted to be raised relatively thereto; a screw having its upper end arranged to support said overlying member; a nut-like element mounted in one of said members and threaded to said screw, one of said threaded parts being rotatably secured to one of said members and the other of said threaded parts being non-rotatably secured to the other of said members; and means operative under abnormal conditions to discontinue any relative movement between said nut and said screw, whereby the raised member may be supported but not further elevated by the action of said screw and said nut.

5. A safety elevating-mechanism combining an elevatable member and a stationary member; two threaded elements, the one being a screw and the other in the nature of a tubular part, one of said elements being rotatably secured to one of said members and the other element being non-rotatably retained by the other member; means normally operative on said elements to cause a relative rotation therebetween, said means being adapted under abnormal conditions to prohibit relative rotation therebetween; and a seat adapted to receive the thrust between said tubular threaded element and the member in which it is mounted.

6. A safety elevating-mechanism combining a member having a socket provided with an annular shoulder at its lower end; a first tubular part carried by said member; a second tubular part located in said socket and having its one end adjacent said shoulder and having its other end engaging said first part so as to be held against rotating relatively thereto; a screw threaded through said second part, said screw on the one hand and said first and second parts on the other hand being arranged to permit normally of a relative rotation therebetween to cause an axial feed of said screw relative to said member, one of said parts being adapted under abnormal conditions to shift axially sufficiently to dis-engage the other part and cause it to serve as a collar non-rotatable on said lifting-screw and to cooperate with said annular shoulder when said second part is disconnected from said first part and thereby render said rotating lifting screw impotent to feed through said second part.

7. A safety elevating-mechanism combining a member having a socket provided with an annular shoulder at its lower end; a first tubular part carried by said member; a second tubular part located in said socket and having its one end adjacent said shoulder and having its other end engaging said first part so as to be held against rotating relatively thereto; a lifting screw; said screw on the one hand and said first and second parts on the other hand being arranged to permit normally of a relative rotation therebetween to cause an axial feed of said screw relative to said member, one of said parts being adapted under abnormal conditions to shift axially sufficiently to dis-engage the other part and cause it to act as a unit with said screw and to serve as a collar thereon whereby said annular shoulder may support the weight on said screw when the further feed of said screw has been arrested by the disengagement of said parts.

8. A safety elevating mechanism combining a lower stationary member and an overlying member adapted to be raised relatively thereto; a threaded part in the nature of a screw having its upper end arranged to support said overlying member; a threaded part in the nature of a nut mounted in one of said members and threaded to said screw, one of said threaded parts being rotatably secured to one of said members and the other of said threaded parts being non-rotatably secured to the other of said members; and means having a clutch-like engagement with the nut-like part operative under abnormal conditions to discontinue any relative movement between said nut-like part and said screw, whereby the raised member may be supported but not further elevated by the action of said screw and said nut.

9. A safety elevating mechanism combining an elevatable member and a stationary member; two threaded elements, the one being a screw and the other in the nature of a tubular part, one of said elements being normally rotatably secured to one of said members and the other element being normally non-rotatably retained by the other member, whereby a relative rotation between said elements will raise said elevatable member; means adapted under abnormal conditions to prohibit relative rotation between said elements and a seat adapted to receive the thrust between said tubular threaded element and the member in which it is mounted to support the weight of said elevatable member when said screw has been rendered impotent.

10. A safety elevating-mechanism combining a lower stationary member and an overlying member adapted to be raised relatively thereto; a non-rotatable screw having its end attached to one of said members; a nut-like element rotatably mounted in the other of said members and threaded to said screw; and self-acting clutch-like means automatically operative under abnormal conditions to discontinue any relative rotation between said nut and said screw whereby the raised member may be supported but not further elevated by the continued rotations of said nut.

11. A safety elevating-mechanism combining an elevatable member and a stationary member; two threaded elements, the one being a screw and the other in the nature of a tubular part, the latter being rotatably retained by one of said members and the other element being non-rotatably seated in the other member; means normally operative on said tubular element to cause a rotation thereof, said means being automatically adapted under abnormal conditions to become detached from said element and cause it to stop; and a seat adapted to receive the thrust between said tubular threaded element and the member in which it is mounted.

12. A safety elevating-mechanism combining a member having a socket provided with an annular shoulder at its lower end; a first tubular part rotatably carried by said member; a second tubular part located in said socket and having its one end adjacent said shoulder and having its other end engaging said first part so as to be rotated thereby; one of said parts being automatically adapted under abnormal conditions to shift axially sufficiently to disengage the other part; and a non-rotatable lifting-screw threaded through said second part and adapted to effect a shift of said second part against said shoulder when said second part is disconnected from said first part and thereby render it impotent to feed through said screw.

In witness whereof, I hereunto subscribe my name, as attested by the two subscribing witnesses.

DAVID C. KLAUSMEYER.

Witnesses:
 C. C. SLETE,
 ANNA M. HUSSIAN.